June 25, 1929.　　　O. LANGE　　　1,718,567
LIQUID DISPENSER
Filed Oct. 22, 1927　　　2 Sheets-Sheet 1

INVENTOR,
Otto Lange
By E. J. Andrews
Att'y.

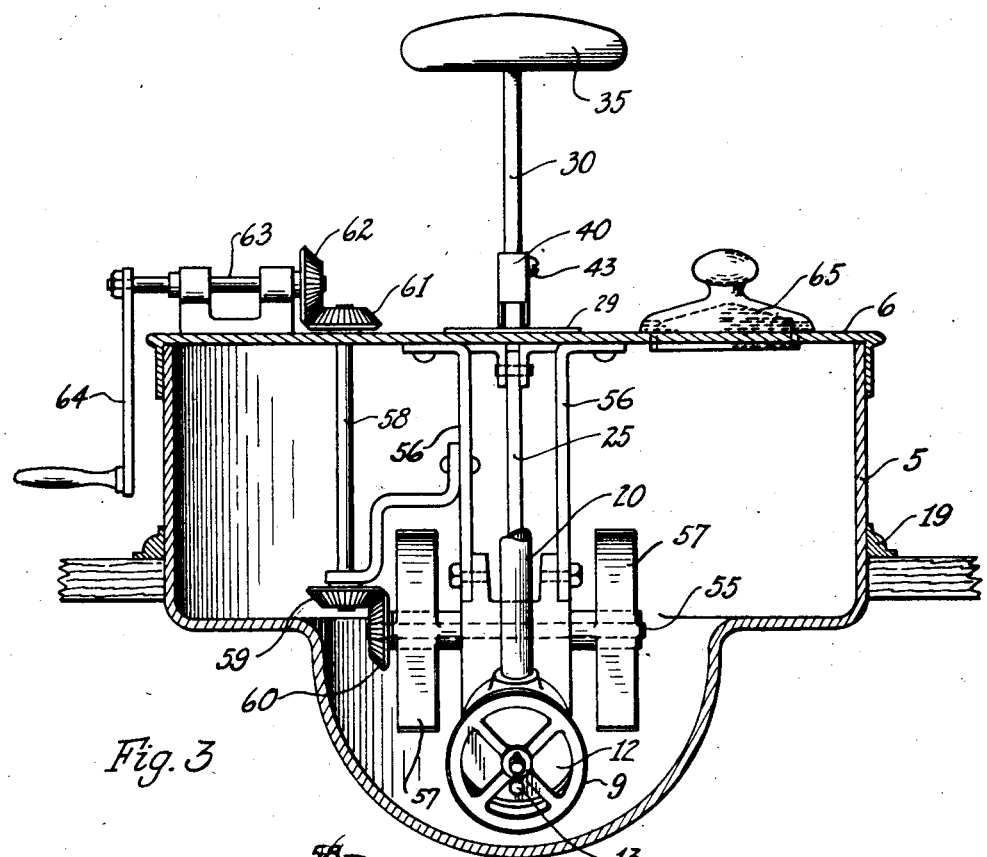
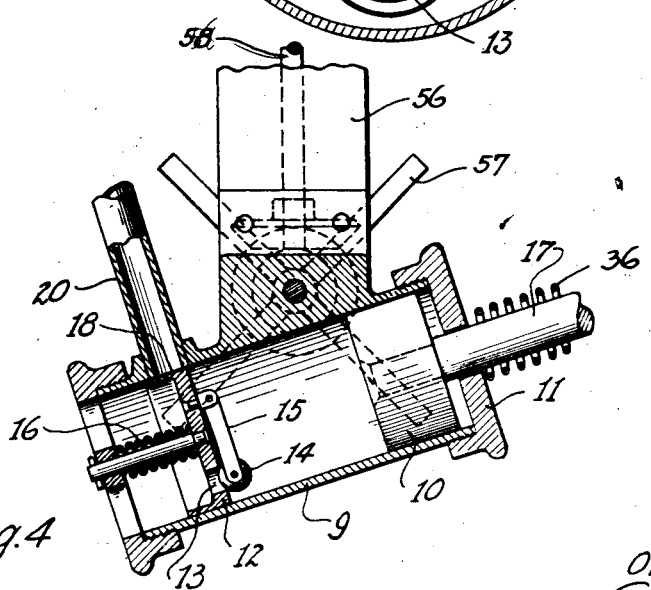

Patented June 25, 1929.

1,718,567

UNITED STATES PATENT OFFICE.

OTTO LANGE, OF CHICAGO, ILLINOIS.

LIQUID DISPENSER.

Application filed October 22, 1927. Serial No. 227,879.

This invention relates to liquid dispensers and it has for its object providing means for dispensing liquids, such as coffee, milk, cream, melted chocolate and the like, particularly where it is desired to dispense uniform amounts of the liquid to customers in restaurants and the like. Another object of the invention is to provide means for stirring the liquid whenever it may be desired to keep it homogeneous throughout and for other reasons. Other objects of the invention will be obvious from a consideration of the accompanying drawings and the following description thereof.

Figure 1:
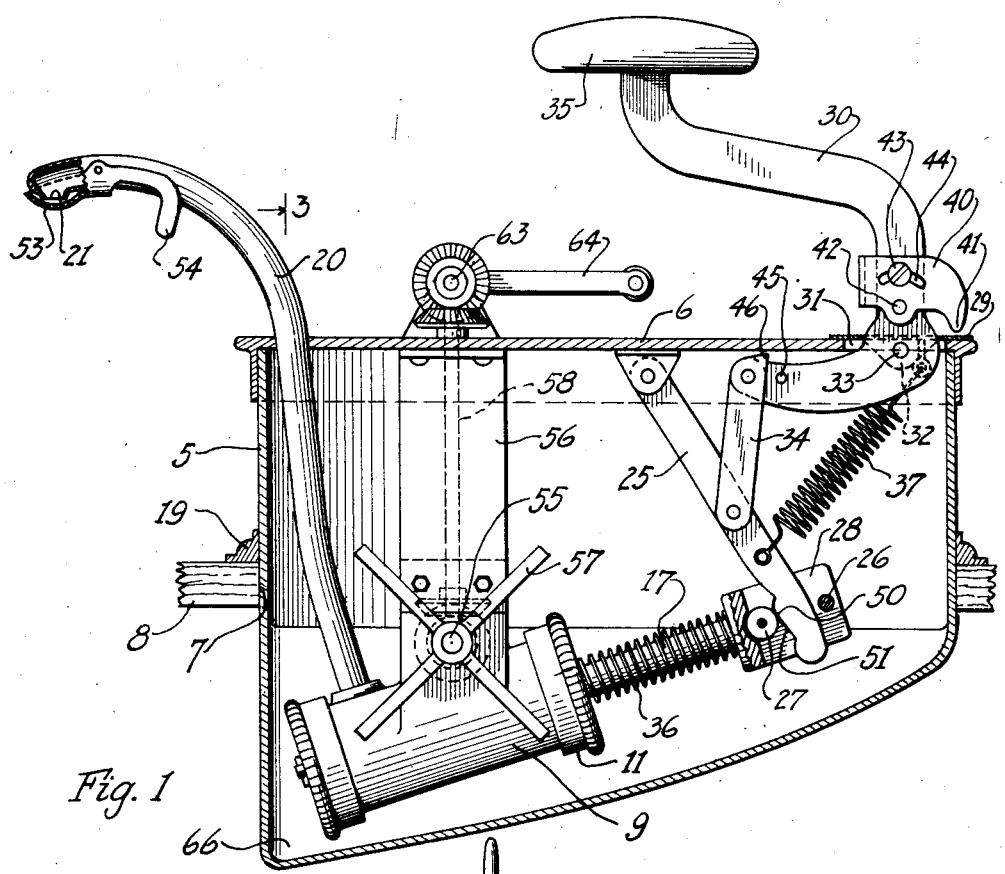
Figure 2:
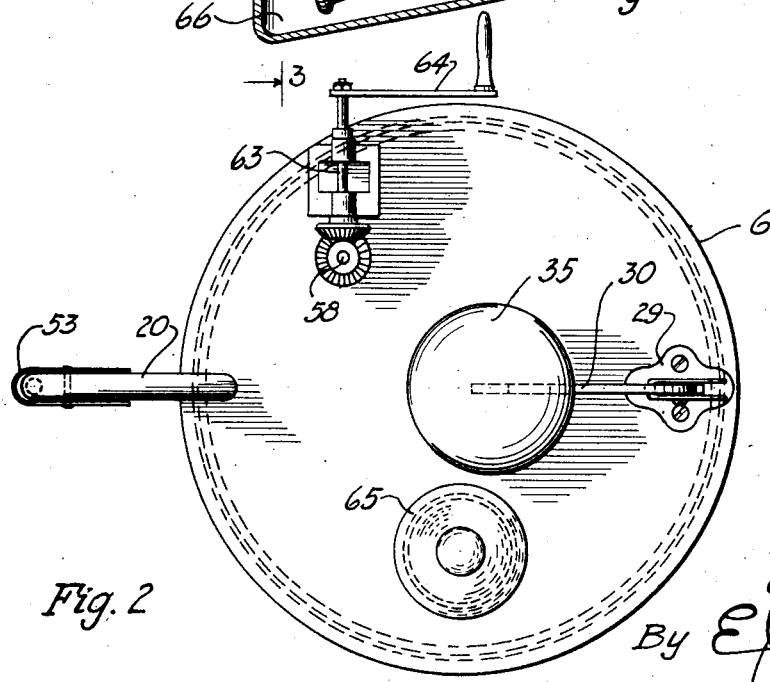

Of the drawings, Fig. 1 is a vertical sectional view of the liquid container, with an elevation of the apparatus for dispensing the liquid, which embodies the features of my invention; Fig. 2 is a reduced plan view of the entire device; Fig. 3 is a vertical sectional view of the container at right angles to the view of Fig. 1, also showing the apparatus in elevation; Fig. 4 is an enlarged sectional view of the dispensing element of the device.

The device comprises any suitable liquid container, such as the vessel 5, having a removable cover 6. The vessel may be mounted in any suitable manner. I prefer to mount it in an opening 7 in the counter 8, from which the liquid is to be dispensed. It is to be understood, however, that the vessel may be portable and mounted in any ordinary way. In the lower portion of the vessel, I provide a cylinder 9 in which is mounted a piston 10. One end of the cylinder is closed by the removable cap 11, and in the other end is slidably mounted a valve disk 12. In the lower portion of the disk 12 is an inlet 13 which is adapted to be closed by a suitable check valve, such as the ball 14 pivotally fixed to the disk 12 in any suitable manner, such as by means of a link 15 pivoted to the disk. The disk is held normally in the position indicated in Fig. 4 by means of a compression spring 16.

In operation, the piston 10 is forced forwardly by means of the stem 17 operated in any suitable manner, and, initially, this presses on the air in the cylinder and forces the disk 12 forwardly until it opens the outlet 18 and allows the air to pass out of the tube 20, which has an opening 21 in its outer end. The piston is then withdrawn and the spring 16 forces the disk 12 inwardly until the opening 18 is closed. The reduced pressure in the cylinder 9, by virtue of the withdrawal of the piston, allows the liquid to force open the check valve 14 and fill the cylinder. Then, when the piston is forced inwardly again, this liquid forces open the outlet 18 and forces the liquid out of the cylinder and into the tube 20. When the tube is thus filled, and the piston is again withdrawn the opening 18 will be closed, holding the liquid in the tube, and if the piston is again forced inwardly, an amount of liquid equal to the capacity of the cylinder will be forced out of the opening 21.

The means provided for operating the piston comprise, in this instance, a pivoted arm 25 which is pivotally associated with the valve stem 17 in any suitable manner. In this instance, I prefer to have the lower end of the arm pass between a pin 26 and a roller 27 pivoted to the outer end of the piston stem by means of a fork 28. The arm 25, and hence the stem 17, are operated by means of a handle 30 passing through an opening 31 in the cover and pivoted to the cover by means of a plate 29 fixed to the cover. The plate has depending lugs 32, and a pin 33 pivots the lever to the lugs. The inner end of this lever is pivotally connected to the arm 25 by means of a link 34.

It will be seen that, by pressing downwardly on the handle 35, the piston 10 will be forced inwardly by the operating means described. A spring 36 tends, at all times, to force the piston outwardly and this is assisted by a spring 37 which tends to pull the arm 25 rearwardly. A stop 40 is arranged so that its nose 41 strikes on the cover and limits the upward movement of the handle 35 and hence the outward movement of the piston. This stop 40 is pivoted to the lever 30 by means of a pin 42 and is adjustably fixed to the lever by means of a screw 43 passing through a slot 44 in the stop. By means of this adjustable stop, the outward movement of the piston can be limited to any predetermined point and hence the amount of liquid that will be forced into the cylinder can be adjusted at pleasure. A pin 45 limits the inward movement of the piston by coming in contact with the nose 46 on the link 34.

In order to facilitate the forcing inwardly of the piston, I provide the roller 27 and provide a projection 50 on the outer end of the arm 25 so as to have the roller coact with the inclined surface 51 on the arm as the piston is being forced inwardly. In this manner, the resistance to the movement is lessened.

In order to prevent dripping from the opening 21 when the piston is withdrawn, I provide a cup 53 which is pivoted to the outer end of the tube 20 and is balanced by a weight 54. When the liquid is forced outwardly, the cup is forced downwardly out of the way, but it returns to its normal position when the piston is withdrawn, and prevents any dripping from the opening 21.

In order to stir the liquid when desired, I provide a shaft 55 supported in any suitable manner, preferably by means of the hangers 56 which support the cylinder 9. On the outer ends of this shaft, I provide paddles 57, and a vertically mounted shaft 58 supports, at its lower end, a bevel gear 59 meshing with a similar gear 60 on the shaft 55. And on the upper end of the shaft 58 is a bevel gear 61 meshing with a gear 62 on a shaft 63. The shaft 63 may be operated by the arm 64 and in this manner the paddles 57 may be operated at will.

A plug 65 is provided for closing an opening in the cover 6. The plug may be removed and the vessel filled with liquid. In order to clean the apparatus, or for any other purpose, the entire mechanism may be removed from the vessel by merely removing the cover 6 which supports all of the mechanism.

In order to remove from the vessel substantially all of the liquid by means of this apparatus, I position the forward end of the cylinder 9, in which is located the inlet 13, in the lowest part of the vessel, and slope the bottom of the vessel downwardly, as indicated, to the lower corner 66 so that the liquid drains into this corner and is substantially all taken up by the mechanism.

I claim as my invention:

1. A liquid dispenser comprising a liquid container, a detachable cover for said container, a dispensing tube supported by said cover, means for forcing liquid into said tube supported by said cover, and means for stirring a liquid in the container, said stirring means being supported by said cover.

2. A liquid dispenser comprising a cylinder, a piston mounted in said cylinder normally adjacent one end thereof, a disk slidably mounted in said cylinder adjacent the other end thereof, said cylinder having a liquid outlet in one side, said disk normally closing said outlet, and yielding means tending to force said disk towards said piston and in its normal outlet closing position, and means for forcing said piston towards said disk, said disk having a liquid inlet and said dispenser comprising a check valve for closing said inlet.

In testimony whereof, I hereunto set my hand.

OTTO LANGE.